United States Patent
Sudou

(10) Patent No.: US 10,245,905 B2
(45) Date of Patent: Apr. 2, 2019

(54) TIRE ABNORMALITY MANAGEMENT SYSTEM AND TIRE ABNORMALITY MANAGEMENT METHOD

(71) Applicant: Komatsu Ltd., Tokyo (JP)

(72) Inventor: Tsugio Sudou, Tokyo (JP)

(73) Assignee: Komatsu Ltd., Tokyo (JP)

( * ) Notice: Subject to any disclaimer, the term of this patent is extended or adjusted under 35 U.S.C. 154(b) by 199 days.

(21) Appl. No.: 15/021,765

(22) PCT Filed: Sep. 20, 2013

(86) PCT No.: PCT/JP2013/075503
§ 371 (c)(1),
(2) Date: Mar. 14, 2016

(87) PCT Pub. No.: WO2015/040745
PCT Pub. Date: Mar. 26, 2015

(65) Prior Publication Data
US 2016/0229234 A1    Aug. 11, 2016

(51) Int. Cl.
*G07C 5/00* (2006.01)
*B60C 23/04* (2006.01)
*B60C 23/20* (2006.01)

(52) U.S. Cl.
CPC ...... *B60C 23/0474* (2013.01); *B60C 23/0479* (2013.01); *B60C 23/0486* (2013.01); *B60C 23/20* (2013.01); *G07C 5/008* (2013.01)

(58) Field of Classification Search
CPC ............ B60C 23/0474; B60C 23/0479; B60C 23/0486; B60C 23/20; G07C 5/008
USPC ....................................................... 701/29.1
See application file for complete search history.

(56) References Cited

U.S. PATENT DOCUMENTS

| 6,385,553 B1 | 5/2002 | Naito et al. |
| 7,616,106 B2 | 11/2009 | Shoyama et al. |
| 2002/0032511 A1 | 3/2002 | Murakami et al. |
| 2004/0148083 A1 | 7/2004 | Arakawa et al. |

(Continued)

FOREIGN PATENT DOCUMENTS

| CN | 101300144 A | 11/2008 |
| CN | 202965845 U | 6/2013 |

(Continued)

OTHER PUBLICATIONS

International Search Report dated Dec. 3, 2013, issued for PCT/JP2013/075503.

*Primary Examiner* — Aaron L Troost
*Assistant Examiner* — Paula L Schneider
(74) *Attorney, Agent, or Firm* — Locke Lord LLP

(57) ABSTRACT

A tire abnormality management system assigns work to each of a plurality of vehicles and manages an abnormal state of a tire mounted on each of the vehicles that perform the assigned work. The tire abnormality management system includes: a tire sensor configured to detect a tire pressure and/or a tire temperature of each of the vehicles; a grouping processing unit configured to group vehicles, in which a tire load of the work assigned to each of the vehicles is within a predetermined range, into a vehicle group; and a tire abnormal vehicle identifying unit configured to identify, among the grouped vehicles, a vehicle with an abnormal tire based on the tire pressure or the tire temperature detected by the tire sensor.

18 Claims, 8 Drawing Sheets

(56) References Cited

U.S. PATENT DOCUMENTS

| | | | |
|---|---|---|---|
| 2007/0057478 A1* | 3/2007 | Shoyama | B60C 23/0408 |
| | | | 280/86.5 |
| 2009/0160629 A1 | 6/2009 | Shimura | |
| 2010/0241307 A1* | 9/2010 | Hara | B60C 11/00 |
| | | | 701/33.4 |
| 2012/0191495 A1 | 7/2012 | McIntosh et al. | |
| 2013/0192814 A1* | 8/2013 | Okubo | B60C 23/18 |
| | | | 165/287 |
| 2014/0244098 A1 | 8/2014 | Ueda et al. | |
| 2014/0277910 A1* | 9/2014 | Suh | B60C 23/02 |
| | | | 701/31.4 |

FOREIGN PATENT DOCUMENTS

| | | |
|---|---|---|
| CN | 203157617 U | 8/2013 |
| DE | 102011084291 A1 | 4/2013 |
| JP | 04-135902 A | 5/1992 |
| JP | 08-144312 A | 6/1996 |
| JP | 11-198619 A | 7/1999 |
| JP | 2002-173954 A | 6/2002 |
| JP | 2007-091202 A | 4/2007 |
| JP | 2008-065753 A | 3/2008 |
| JP | 2009-234298 A | 10/2009 |
| JP | 2012-160085 A | 8/2012 |
| JP | 2013-105278 A | 5/2013 |
| WO | 2015/040744 A1 | 3/2015 |
| WO | 2015/114792 A1 | 8/2015 |

\* cited by examiner

TIRE ABNORMALITY MANAGEMENT SYSTEM AND TIRE ABNORMALITY MANAGEMENT METHOD

FIELD

The present invention relates to a tire abnormality management system and a tire abnormality management method that can rapidly detect an abnormal state of a tire.

BACKGROUND

Conventionally, at large work sites such as a rock crushing site and mine, transportation of soil is performed by running a dump truck. That is, crushed rocks are loaded on the dump truck as cargo by an excavator, a wheel loader, and the like at a loading site. The dump truck then transports the cargo to a soil discharging site via a predetermined running route, and unloads the cargo at the soil discharging site. Then, the dump truck moves to the loading site again via the predetermined running route and waits for another cargo to be loaded at the loading site. The dump truck repeatedly performs such series of work.

Among the life cycle costs of the dump truck, the ratio of the cost of the tire is high. Therefore, it is requested to extend the life of the tire and to reduce the life cycle cost.

In order to reduce the tire life cycle cost, for example, in Patent Literature 1, it is determined that a tire is abnormal in a case where an internal pressure of the tire or an internal temperature of the tire is out of an allowable range as the result of comparing tire information of the internal pressure of the tire and the internal temperature of the tire with past tire information stored in a storage unit.

CITATION LIST

Patent Literature

Patent Literature 1: Japanese Laid-open Patent Publication No. 2009-234298

SUMMARY

Technical Problem

However, a tire is placed in an environment different for each vehicle, and only a state of the tire is simply measured. Therefore, it is not easy to determine an abnormal state of the tire in an early stage. That is, at the stage in which the abnormal state of the tire is detected, there is a possibility that the degree of abnormality of the tire is already large.

The present invention has been made in view of the above, and an object thereof is to provide a tire abnormality management system and a tire abnormality management method that can rapidly detect an abnormal state of a tire.

Solution to Problem

To solve the above-described problem and achieve the object, a tire abnormality management system according to the present invention assigns work to each of a plurality of vehicles, manages an abnormal state of a tire mounted on each of the vehicles that perform the assigned work and includes: a tire sensor configured to detect a tire pressure and/or a tire temperature of each of the vehicles; a grouping processing unit configured to group vehicles, in which a tire load of the work assigned to each of the vehicles is within a predetermined range, into a vehicle group; and a tire abnormal vehicle identifying unit configured to identify, among the grouped vehicles, a vehicle with an abnormal tire based on the tire pressure or the tire temperature detected by the tire sensor.

Moreover, in the above-described tire abnormality management system according to the present invention, the tire abnormal vehicle identifying unit, among the grouped vehicles, determines a statistic based on the tire pressure or the tire temperature detected by the tire sensor, and when there is a vehicle with the statistic exceeding a reference range, the tire abnormal vehicle identifying unit identifies such vehicle as a vehicle with an abnormal tire.

Moreover, the above-described tire abnormality management system according to the present invention includes an actual tire load calculation unit configured to calculate an actual tire load which is a tire load of the vehicle in actual operation based on loaded amount information and vehicle speed information notified from each of the vehicles connected wirelessly, and the grouping processing unit groups vehicles, in which an actual tire load of work assigned to each of the vehicles is within a predetermined range, into a vehicle group.

Moreover, the above-described tire abnormality management system according to the present invention includes a predicted tire load calculation configured to that calculate a predicted tire load of work in a planning stage assigned to each of the vehicles, and the grouping processing unit groups vehicles, in which a predicted tire load of work assigned to each of the vehicles is within a predetermined range, into a vehicle group.

Moreover, in the above-described tire abnormality management system according to the present invention, information on the vehicle identified by the tire abnormal vehicle identifying unit is output externally.

Moreover, in the above-described tire abnormality management system according to the present invention, the tire load is a TKPH.

Moreover, a tire abnormality management method according to the present invention assigns work to each of a plurality of vehicles, manages an abnormal state of a tire mounted on each of the vehicles that perform the assigned work and includes: a detection step of detecting a tire pressure and/or a tire temperature of each of the vehicles; a grouping processing step of grouping vehicles, in which a tire load of the work assigned to each of the vehicles is within a predetermined range, into a vehicle group; and a tire abnormal vehicle identifying step of identifying, among the grouped vehicles, a vehicle with an abnormal tire based on the tire pressure or the tire temperature detected by the tire sensor.

Moreover, in the above-described tire abnormality management method according to the present invention, the tire abnormal vehicle identifying step, among the grouped vehicles, determines a statistic based on the tire pressure or the tire temperature detected by the detection step, and when there is a vehicle with the statistic exceeding a reference range, the tire abnormal vehicle identifying step identifies such vehicle as a vehicle with an abnormal tire.

Moreover, the above-described tire abnormality management method according to the present invention includes an actual tire load calculation step of calculating an actual tire load which is a tire load of the vehicle in actual operation based on loaded amount information and vehicle speed information notified from each of the vehicles connected wirelessly, and the grouping processing step groups vehicles, in which an actual tire load of work assigned to each of the vehicles is within a predetermined range, into a vehicle group.

Moreover, the above-described tire abnormality management method according to the present invention includes a predicted tire load calculation step of calculating a predicted tire load of work in a planning stage assigned to each of the vehicles, and the grouping processing step groups vehicles, in which a predicted tire load of work assigned to each of the vehicles is within a predetermined range, into a vehicle group.

Moreover, in the above-described tire abnormality management method according to the present invention, information on the vehicle identified by the tire abnormal vehicle identifying step is output externally.

Moreover, in the above-described tire abnormality management method according to the present invention, the tire load is a TKPH.

According to the present invention, the tire sensor detects the tire pressure and/or the tire temperature of each vehicle, the grouping processing unit groups vehicles, in which a tire load of work assigned to each vehicle is within a predetermined range, into a vehicle group, and the tire abnormal vehicle identifying unit identifies, among the grouped vehicles, a vehicle with an abnormal tire based on the tire pressure or the tire temperature detected by the tire sensor. Therefore, the abnormal state of the tire can be rapidly detected.

DESCRIPTION OF EMBODIMENTS

In the following, embodiments of the present invention will be described with reference to the attached drawings.

First Embodiment

[Overview of System]

Figure 1:
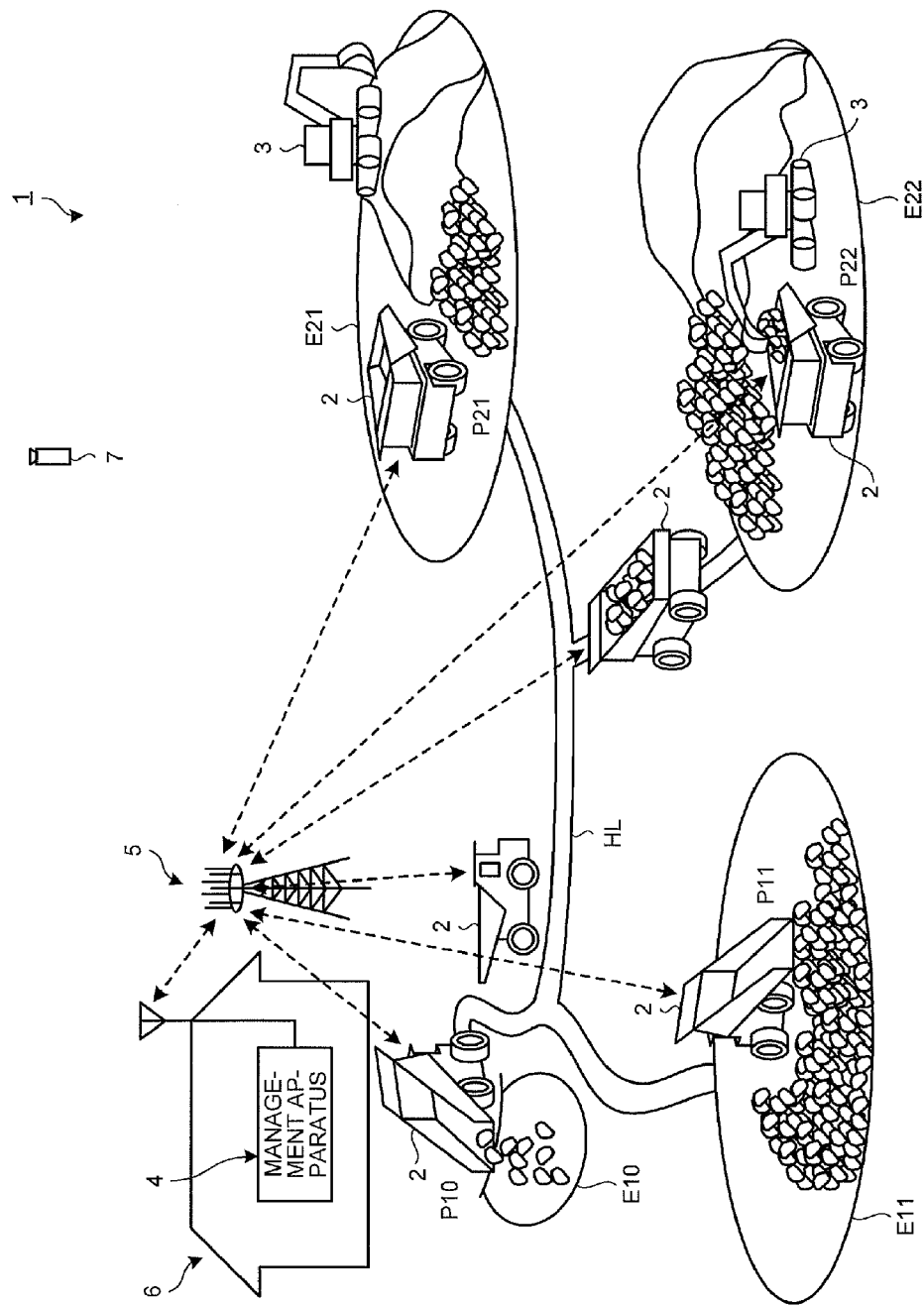
FIG. 1 is a schematic view illustrating a schematic configuration of a management system including a tire abnormality management system according to a first embodiment of the present invention.

FIG. 1 is a schematic view illustrating a schematic configuration of a management system including a tire abnormality management system according to a first embodiment of the present invention. A management system 1 is provided at a large work site such as a rock crushing site and mine, and transportation of soil, ores, and the like is performed by running a plurality of dump trucks 2. At the large work site, there are loading sites E21 and E22. A loading machine 3 is disposed at each of the loading sites E21 and E22. The loading machine 3 is capable of loading a cargo on the dump truck 2. The loading machine 3 is an excavator, an electric shovel, a wheel loader, or the like. The dump truck 2 is an example of a vehicle capable of running for transporting the cargo. The cargo is soil and ores generated by mining.

The dump truck 2 is capable of running a running path HL between the loading sites E21 and E22 and soil discharging sites E10 and E11. The dump truck 2 is loaded with the cargo at the loading sites E21 and E22. The loading sites E21 and E22 are regions in which the cargo is loaded in the mine. The dump truck 2 is loaded with the cargo at loading positions P21 and P22 of the loading sites E21 and E22. The loading machine 3 loads the cargo on the dump truck 2 located at the loading positions P21 and P22. Thereafter, the dump truck 2 moves to the objective soil discharging sites E10 and E11 via the predetermined running path HL. Then, the dump truck 2 unloads the cargo at the objective soil discharging sites E10 and E11. The soil discharging sites E10 and E11 are regions in which the cargo is discharged in the mine. The dump truck 2 discharges the cargo at soil discharging positions P10 and P11 of the soil discharging sites E10 and E11.

The management system 1 manages at least the plurality of dump trucks 2. Each dump truck 2 is an unmanned dump truck operated by a command signal from a management apparatus 4, that is, no operator is in the dump truck 2. The management apparatus 4 is disposed in a control facility 6. Between the management apparatus 4 and the dump truck 2, a wireless communication system wirelessly connecting the management apparatus 4 and the dump truck 2 via a base station 5 is formed.

[Example of Running Route Network]

Figure 2:
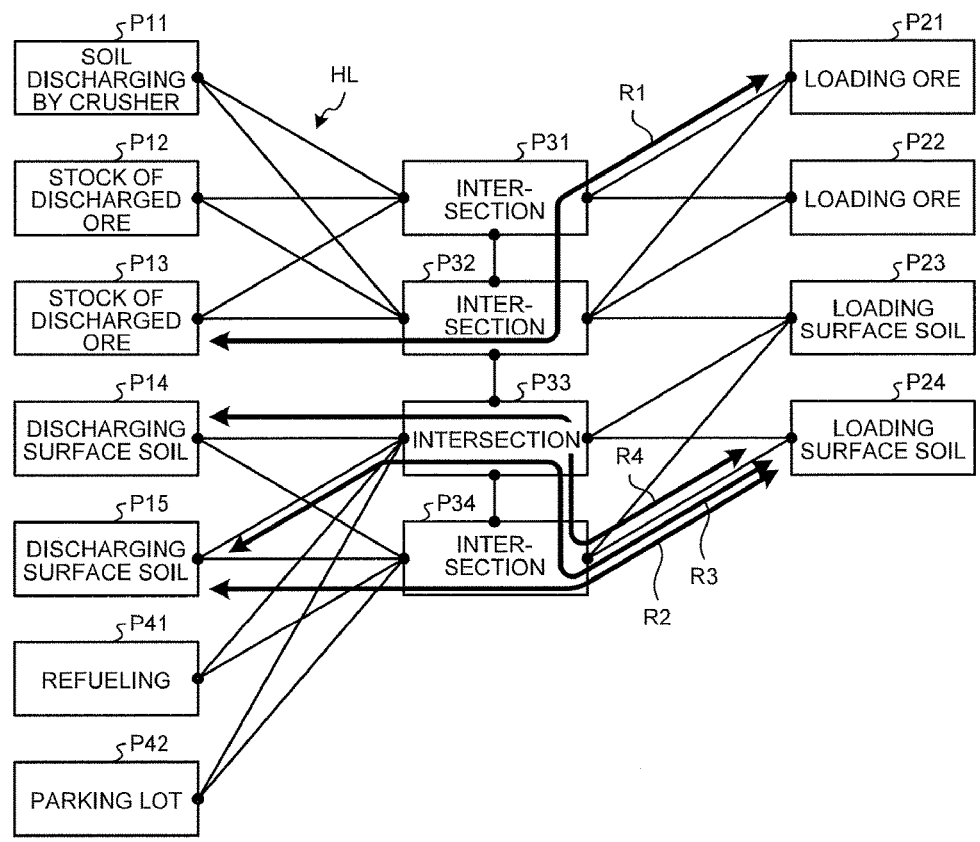
FIG. 2 is a diagram illustrating an example of a running route network stored in a running route information DB.

The dump truck 2 repeats the cycle of transporting the cargo from the loading site to the soil discharging site, discharging the cargo at the soil discharging site, and then returning to the loading site without the cargo. Work performed by the dump truck 2 includes loading of the cargo, loaded running, discharging soil, and unloaded running. A large work site, as indicated in the running route network illustrated in FIG. 2, has a plurality of loading positions P21 to P24 of the loading sites, a plurality of soil discharging positions P11 to P15 of the soil discharging sites, a plurality of intersections P31 to P34, and a plurality of running paths HL connecting between the loading positions P21 to P24, the soil discharging positions P11 to P15, and the intersections P31 to P34. In FIG. 2, the loading positions P21 and P22 are loading positions of ores, and the loading positions P23 and 24 are loading positions of surface soil. Moreover, the soil discharging position P11 is a soil discharging position for the crusher, the soil discharging positions P12 and P13 are soil discharging positions of the ores, and the soil discharging positions P14 and P15 are soil discharging positions of the surface soil. There are also a refueling position P41 and a parking lot position P42. Specific work of the dump truck 2 is, for example, work that passes through a running route R1 illustrated in FIG. 2. That is, the dump truck 2 is loaded with ores at the loading position P21 and transports the ores via the intersections P31 and P32, discharges the ores at the soil discharging position P13, and returns to the loading position P21 via the intersections P32 and P31. The dump truck 2 performs work according to the operation instruction from the management apparatus 4. The operation instruction includes information of loading sites, soil discharging sites, and running routes. The work performed by the dump truck 2 may include the running to the refueling position and the running to the parking lot position.

[Dump Truck]

Figure 3:
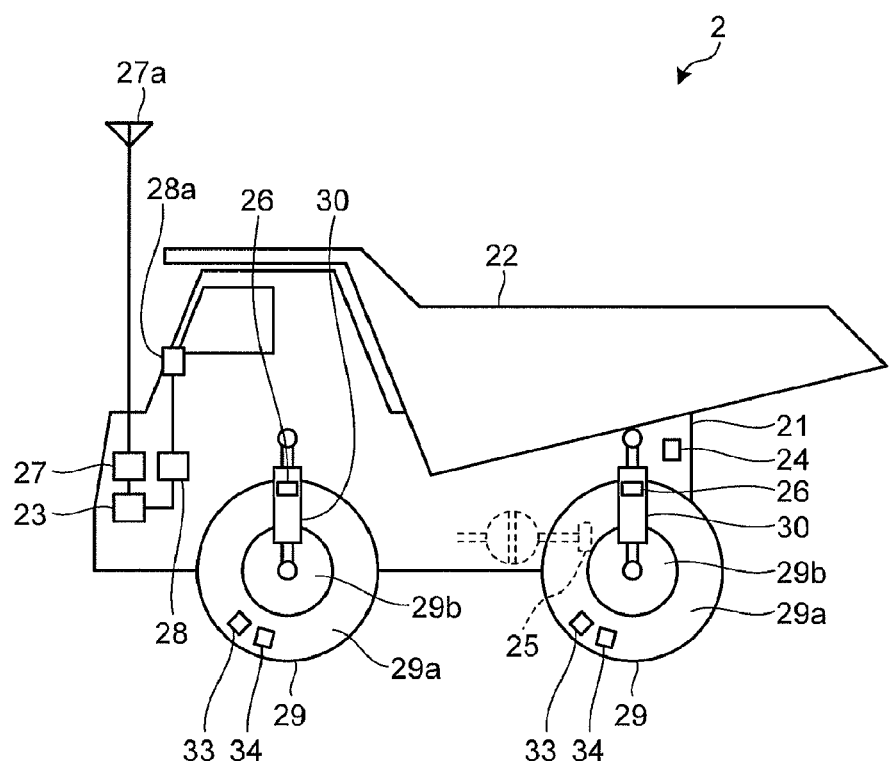
FIG. 3 is a side view illustrating a configuration of a dump truck.
Figure 4:
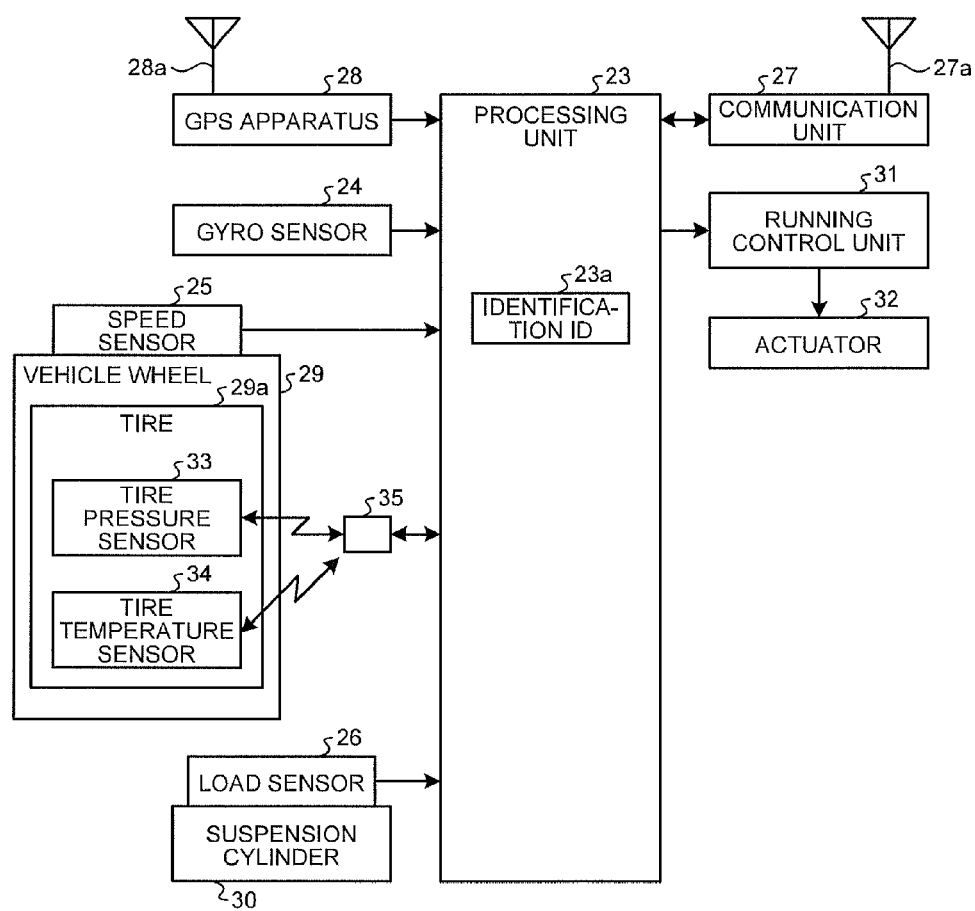
FIG. 4 is a block diagram illustrating the configuration of the dump truck.

As illustrated in FIGS. 3 and 4, the dump truck 2 has a vehicle main body 21, a vessel 22, a processing unit 23, a gyro sensor 24, a speed sensor 25, a load sensor 26, a communication unit 27 to which an antenna 27a is connected, a GPS apparatus 28 to which an antenna 28a is connected and which detects a position of the vehicle main body 21, a tire pressure sensor 33, a tire temperature sensor 34, and a sensor information acquisition unit 35. A driving apparatus is disposed in the vehicle main body 21. The driving apparatus includes an internal combustion engine such as a diesel engine, a generator operated by the internal combustion engine, and an electric motor operated by the power generated by the generator. A vehicle wheel 29 is driven by the electric motor. The vehicle wheel 29 is of a so-called electric driven type including a tire 29a and a wheel 29b. The vehicle wheel may be of a so-called mechanical driven type, which transmits motive power of the internal combustion engine to the vehicle wheel via a transmission including a torque converter.

The vessel 22 includes a load-carrying platform on which the cargo is loaded. The vessel 22 is disposed on top of the vehicle main body 21 so as to be swingable. The cargo is loaded into the vessel 22 by the loading machine 3. At the soil discharging time, the vessel 22 is lifted to discharge the cargo. The load sensor 26 is provided on a suspension cylinder 30 and detects the loaded amount in the vessel 22. The load sensor 26 outputs a detection signal to the processing unit 23. The processing unit 23 determines the loaded amount in the dump truck 2 based on the detection signal of the load sensor 26.

The gyro sensor 24 detects an orientation change amount of the dump truck 2. The gyro sensor 24 outputs a detection signal to the processing unit 23. The processing unit 23 can determine an orientation of the dump truck 2 based on the detection signal of the gyro sensor 24.

The speed sensor 25 detects a running speed of the dump truck 2. The speed sensor 25 detects the running speed of the dump truck 2 by detecting a rotational speed of a drive shaft of the vehicle wheel 29. The speed sensor 25 outputs a detection signal to the processing unit 23. The processing unit 23 can determine a moving distance (running distance) of the dump truck 2 based on the detection signal of the speed sensor 25 and time information from a timer (not illustrated) incorporated in the processing unit 23.

The GPS apparatus 28 detects the position of the dump truck 2 using signals from a plurality of global positioning system (GPS) satellites 7 (refer to FIG. 1). The detection signal is output to the processing unit 23.

The tire pressure sensor 33 and the tire temperature sensor 34 are each incorporated in the tire 29a. The tire pressure sensor 33 and the tire temperature sensor 34 detect the tire pressure and the tire temperature, respectively. The sensor information acquisition unit 35 acquires tire pressure information and tire temperature information by wirelessly connecting to the tire pressure sensor 33 and to the tire temperature sensor 34. The sensor information acquisition unit 35 outputs the acquired tire pressure information and tire temperature information to the processing unit 23. The tire pressure sensor 33 and the tire temperature sensor 34 are RFIDs with low frequency, and the sensor information acquisition unit 35 can acquire the tire pressure information and the tire temperature information in a non-contact manner. More reliably, it is preferable that the tire pressure sensor 33 and the tire temperature sensor 34 each have a built-in battery, and be wirelessly connected to the sensor information acquisition unit 35.

The processing unit 23 has an identification ID 23a that identifies the dump truck 2. The processing unit 23 transmits, together with the identification ID 23a, at least vehicle position information, loaded amount information, vehicle speed information, the tire pressure information, and the tire temperature information to the management apparatus 4 via the communication unit 27.

In response, the management apparatus 4 outputs, together with the identification ID 23a, the running route and speed command to the dump truck 2 so that the dump truck 2 runs on the running route corresponding to the planned work. A running control unit 31 controls the running of the dump truck 2 by controlling driving of a corresponding actuator 32 based on the input running route and speed command.

[Management Apparatus]

Figure 5:
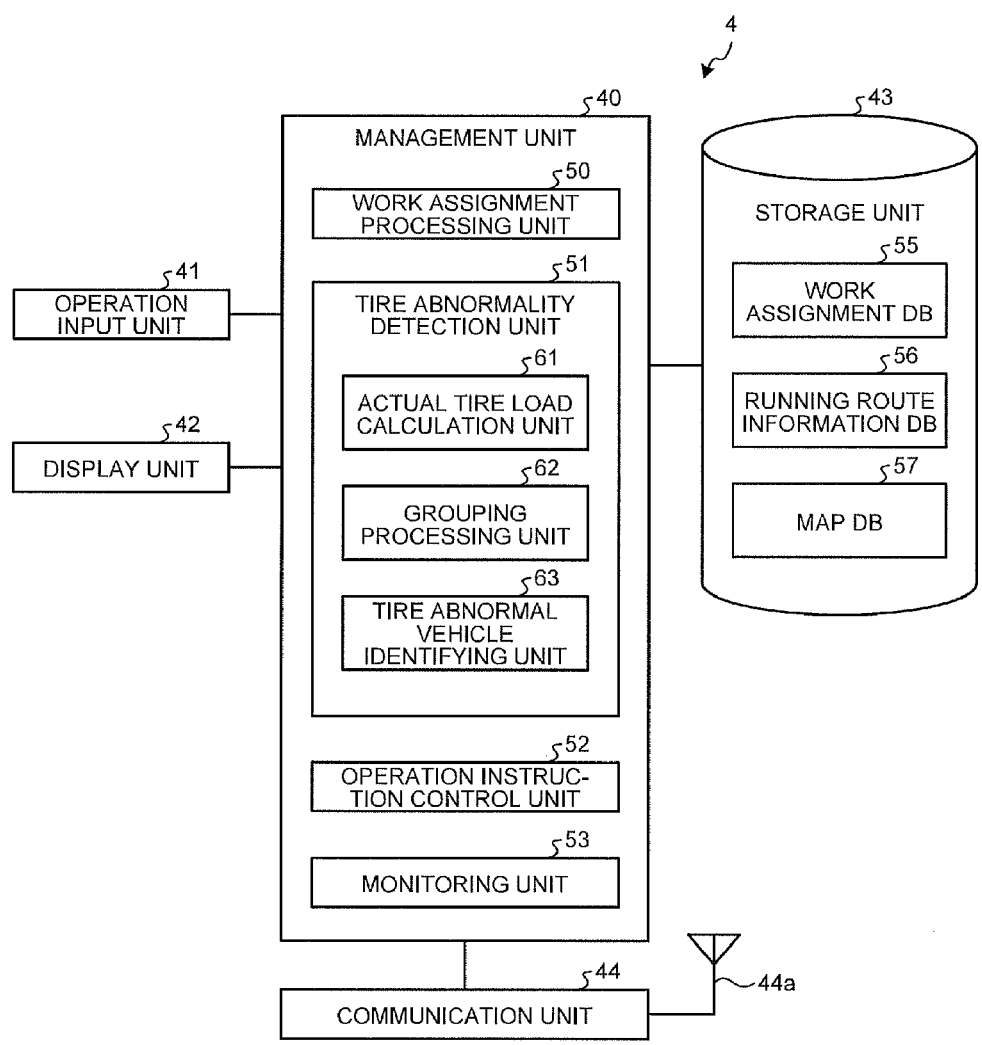
FIG. 5 is a block diagram illustrating a configuration of a management apparatus according to the first embodiment.

As illustrated in FIG. 5, the management apparatus 4 has a management unit 40, an operation input unit 41, a display unit 42, a storage unit 43, and a communication unit 44 including an antenna 44a.

The operation input unit 41 includes a keyboard, a touch panel, a mouse, and the like. The operation input unit 41 is capable of inputting an operation signal to the management unit 40. The operation input unit 41 may be a touch panel that functions also as the display unit 42.

The display unit 42 includes, for example, a flat panel display such as a liquid crystal display. The display unit 42 is capable of displaying information on the position of the dump truck 2.

The storage unit 43 has a work assignment database (DB) 55, a running route information database (DB) 56, and a map database (DB) 57. In the work assignment DB 55, for example, a plurality of work contents done in a day is described in association with each identification ID 23a of the dump truck 2. In the work contents, the loading site, the soil discharging site, and the running route are described. For each identification ID 23a of the dump truck 2, a set tire load, an actual tire load, and a predetermined tire load are described. The set tire load and the predetermined tire load are values that are set in advance. On the other hand, the actual tire load is a value updated in real time during operation of the dump truck 2.

Generally, the tire load includes a tire TKPH (Ton Km Per Hour) which is a load index set in advance to the tire itself, and a working condition TKPH which is a load index in actual work. The set tire load is the tire TKPH, the index indicating the possible work amount within the range not exceeding the limit for heat generation of the tire, and is represented by (load×speed). On the other hand, the working condition TKPH is the actual tire load, and is represented by (average applied tire load)×(average working speed). The average applied tire load is determined by:

average applied tire load=((applied tire load when vehicle is empty)+(applied tire load when vehicle is loaded))/2.

The average working speed is determined by:

average working speed=((distance of one cycle)× (number of cycles in a day))/(total working time in a day).

The applied tire load, when the vehicle is empty, is the average applied tire load obtained by dividing the load, registered in advance, of the empty dump truck 2 by the number of tires of the dump truck. Moreover, the applied tire load, when the vehicle is loaded, is the average applied tire load obtained by dividing the load of the loaded dump truck 2 determined based on the loaded amount information sent from the dump truck 2 by the number of tires of the dump truck. It is preferable to use the tire so as to satisfy set tire load>actual tire load. When used without satisfying this condition, the tire causes, for example, heat separation which shortens the tire life. The predetermined tire load is a value set in the embodiment, and is a threshold value equal to or less than the set tire load.

In the running route information DB 56, the information of the running route network illustrated in FIG. 2 is described. The information of the running route network includes each position information such as the loading position, the soil discharging position, and the intersection, and each connection relationship information. In the running route information DB 56, the vehicle speed set on each running path HL is defined.

The communication unit 44 is connected communicatively to each dump truck 2 via the antenna 44a and the base station 5.

The management unit 40 has a work assignment processing unit 50, a tire abnormality detection unit 51, an operation instruction control unit 52, and a monitoring unit 53. The work assignment processing unit 50 performs processing of creating the work assignment DB 55 of a day according to the operation input from the operation input unit 41. At that time, the actual tire load of the work assignment DB 55 is not set.

The tire abnormality detection unit 51 has an actual tire load calculation unit 61, a grouping processing unit 62, and a tire abnormal vehicle identifying unit 63. The actual tire load calculation unit 61 calculates the actual tire load of the dump truck 2 in actual operation based on the loaded amount information and the vehicle speed information notified from each dump truck 2 connected wirelessly. The grouping processing unit 62 groups dump trucks, in which a tire load of work assigned to each dump truck 2 is within a predetermined range, into a dump truck group. The tire abnormal vehicle identifying unit 63, among the grouped dump trucks, determines a statistic based on the tire pressure or the tire temperature, and when there is a dump truck 2 with the statistic exceeding the reference range, the tire abnormal vehicle identifying unit 63 identifies such dump truck 2 as a dump truck with an abnormal tire. The statistic is obtained by performing statistical calculation on the acquired tire pressure or tire temperature and is, for example, a deviation between the tire pressures or the tire temperatures of the grouped dump trucks and an average value thereof. Detailed processing in the tire abnormality detection unit 51 will be described later.

The operation instruction control unit 52, as will be described later, outputs to each dump truck 2 an instruction which causes the dump truck 2 to execute the work contents described in the work assignment DB 55, and instructs the running control of the dump truck 2.

The monitoring unit 53 monitors the operating status of the dump truck 2. Furthermore, the monitoring unit 53 displays the operating status of the dump truck 2 on the display unit 42 based on the vehicle position information and the vehicle speed information transmitted from the dump truck 2. At this time, a map from the map DB 57 is displayed on the display unit 42. On the map, the running route network from the running route information DB 56, and an icon of the dump truck 2 are displayed. The icon is displayed differently between a loaded state and an unloaded state. For example, the color of a load-carrying platform is changed between the loaded state and the unloaded state. In addition, the identification ID of the dump truck is also added on the icon. The display unit 42 displays and outputs information of the dump truck 2 identified by the tire abnormal vehicle identifying unit 63, and the fact that the tire 29a is abnormal. Of course, it is preferable to notify the outside such as a service person of the information of the dump truck 2 and the information of the fact that the tire is abnormal via communication means (not illustrated).

[Running Control of Dump Truck]

As described above, the management unit 40 outputs the running route and the speed command to the dump truck 2. As a result, the dump truck 2 runs on the running path HL between the loading site and the soil discharging site based on the input running route and speed command. The processing unit 23 runs the dump truck 2 according to the created running route while estimating the current position of the dump truck 2 using dead reckoning. The dead reckoning is a navigation to estimate the current position of the dump truck 2 based on the orientation and the moving distance from the origin whose latitude and longitude are known. The orientation of the dump truck 2 is detected using the gyro sensor 24 disposed in the dump truck 2. The moving distance of the dump truck 2 is detected using the speed sensor 25 disposed in the dump truck 2. The processing unit 23 outputs a steering command and a speed command to the running control unit 31 so that the dump truck 2 runs on the planned running route, based on the orientation and the moving distance of the dump truck 2.

The processing unit 23 runs the dump truck 2 while correcting the estimated position determined by the dead reckoning described above using the GPS apparatus 28. When the running distance of the dump truck 2 gets longer, an error between the estimated position and the actual position occurs due to the accumulation of the detection error of the gyro sensor 24 and the speed sensor 25. As a result, there is a possibility that the dump truck 2 runs deviating from the running route. Therefore, the processing unit 23 runs the dump truck 2 while making corrections using the position information of the dump truck 2 detected by the GPS apparatus 28.

[Tire Abnormality Detection Processing]

The tire abnormality detection processing procedure by the tire abnormality detection unit 51 will be described with reference to the flowchart illustrated in FIG. 6. The processing is repeatedly performed at predetermined intervals.

Figure 6:
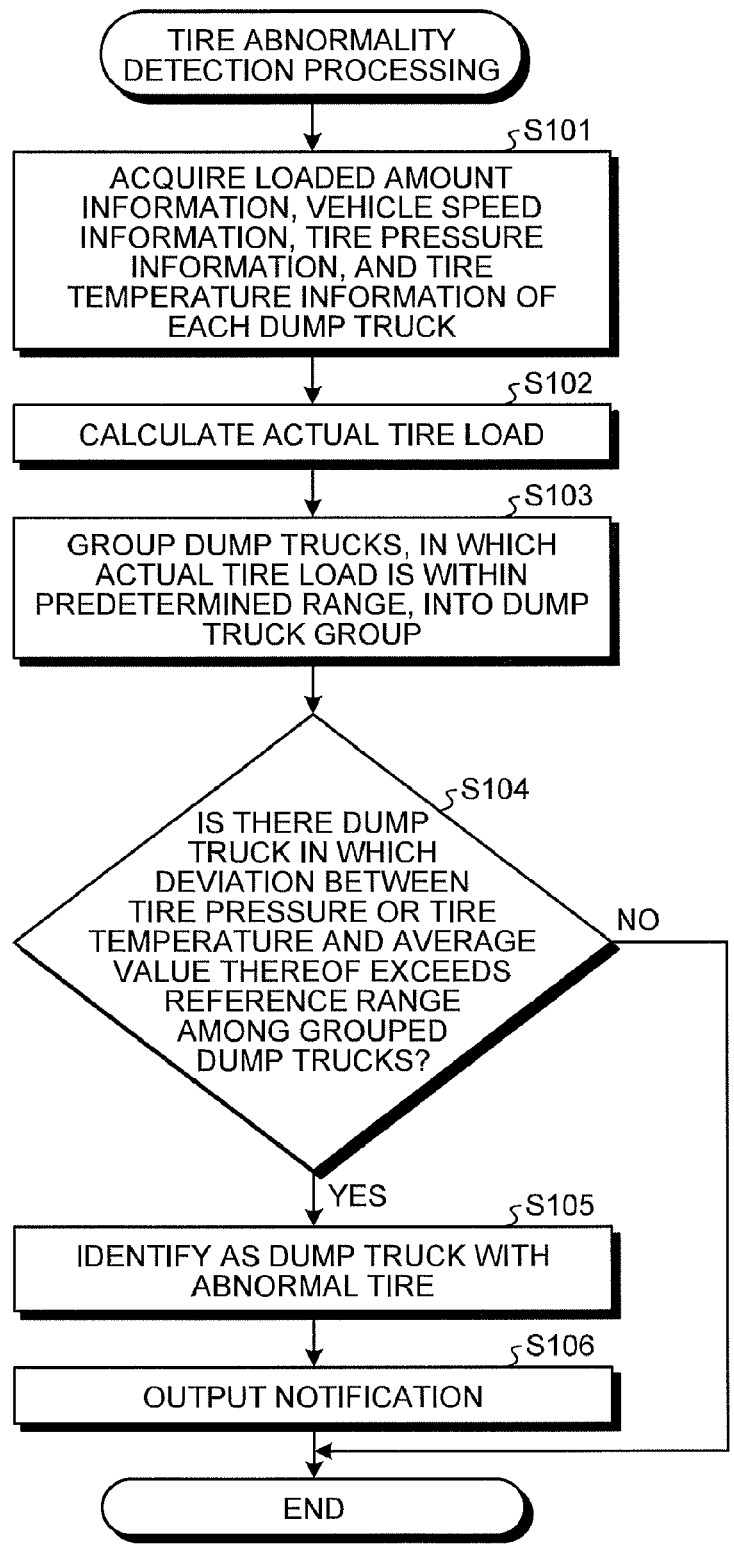
FIG. 6 is a flowchart illustrating a tire abnormality detection processing procedure by a tire abnormality detection unit.

In FIG. 6, first, the actual tire load calculation unit 61 acquires the loaded amount information, the vehicle speed information, the tire pressure information, and the tire temperature information of each dump truck 2 (step S101). Then, the actual tire load calculation unit 61 calculates the actual tire load of one work cycle (step S102). In step S102, the actual tire load of one work cycle is calculated. Alternatively, however, the actual tire loads of a plurality of work cycles may be calculated. Thereafter, the grouping processing unit 62 performs processing of grouping the dump trucks, in which the actual tire load calculated by the actual tire load calculation unit 61 is within a predetermined range, into a dump truck group (step S103). After that, the tire abnormal vehicle identifying unit 63, among the grouped dump trucks, determines the statistic, which is, for example, the deviation between the tire pressures or the tire temperatures and the average value thereof, based on the tire pressures or the tire temperatures. Then, the tire abnormal vehicle identifying unit 63 determines whether there is a dump truck 2 with the statistic (deviation) exceeding the reference range (step S104).

Such deviation is used in order to determine whether there is a dump truck in which a value of the tire pressure or the tire temperature is largely deviated from the average value of the tire pressures or the tire temperatures of the grouped dump trucks. The tire pressure or the tire temperature of each dump truck used for comparison is the average value with respect to average values sampled in a measurement period of one work cycle. In addition, the average value is an example of the statistic, and may be, for example, a standard deviation or the like. Furthermore, in a period of one work cycle, a deviation of the tire pressure or the tire temperature between the loaded state of the cargo of going and the unloaded state of returning is defined as the statistic, and the difference of such deviation may be used for the determination. Alternatively, a deviation between a maximum value and a minimum value of the tire pressure or the tire temperature in the measurement period is defined as the statistic, and the difference of such deviation may be used for the determination. Moreover, on two dimensional coordinates of the average value of the tire pressure and the average value of the tire temperature, an average value of the tire temperature with respect to an average value of the tire pressure of each dump truck is plotted. Whether an average value of a distance from a plotted value of one dump truck to a plotted value of another dump truck, on the two dimensional coordinates, exceeds a reference range may be used for the determination. In this case, the determination considering both the tire pressure and the tire temperature is possible. A difference of a distance from a plotted value may be used for the determination. The plotted value indicates an average position on the two dimensional coordinates, which is defined by an average value with respect to the average values of the tire pressures of all dump trucks, and an average value with respect to the average values of the tire temperatures of all dump trucks.

Among the grouped dump trucks, when there is no dump truck 2 in which the deviation between the tire pressure or the tire temperature and the average value thereof exceeds the reference range (step S104, No), the present processing ends. On the other hand, among the grouped dump trucks, when there is a dump truck 2 in which the deviation between the tire pressure or the tire temperature and the average value thereof exceeds the reference range (step S104, Yes), the dump truck 2 is identified as a dump truck 2 with an abnormal tire (step S105). Then, the fact that the dump truck 2 is abnormal is displayed and output on the display unit 42, along with a notification to an external service center (not illustrated) (step S106), and the present processing ends.

The actual tire load calculation unit 61 described above may be provided in the dump truck 2 and configured to transmit the calculation result to the management apparatus 4. In a case of a dump truck as a manned vehicle, a display unit, which displays the fact that a dump truck is abnormal, may be provided in the driver's seat of the dump truck.

According to the first embodiment, the dump trucks, in which substantially the same actual tire load is within the predetermined range, are grouped into a dump truck group. Then, a dump truck in which the statistic such as the deviation between the tire pressure or the tire temperature and the average value thereof is out of the reference range is identified as the abnormal dump truck among the dump trucks. Therefore, under substantially the same actual tire load condition, the abnormality of the tire can be found at an early stage, and the abnormal state of the tire can be rapidly detected. Specifically, since the grouped dump trucks are working with similar tire loads, the tire pressures or the tire temperatures of the respective dump trucks should be similar values. Therefore, small changes in the tire pressure and the tire temperature can be found at the early stage, and as a result, the abnormality of the tire can be rapidly detected.

Second Embodiment

Figure 7:
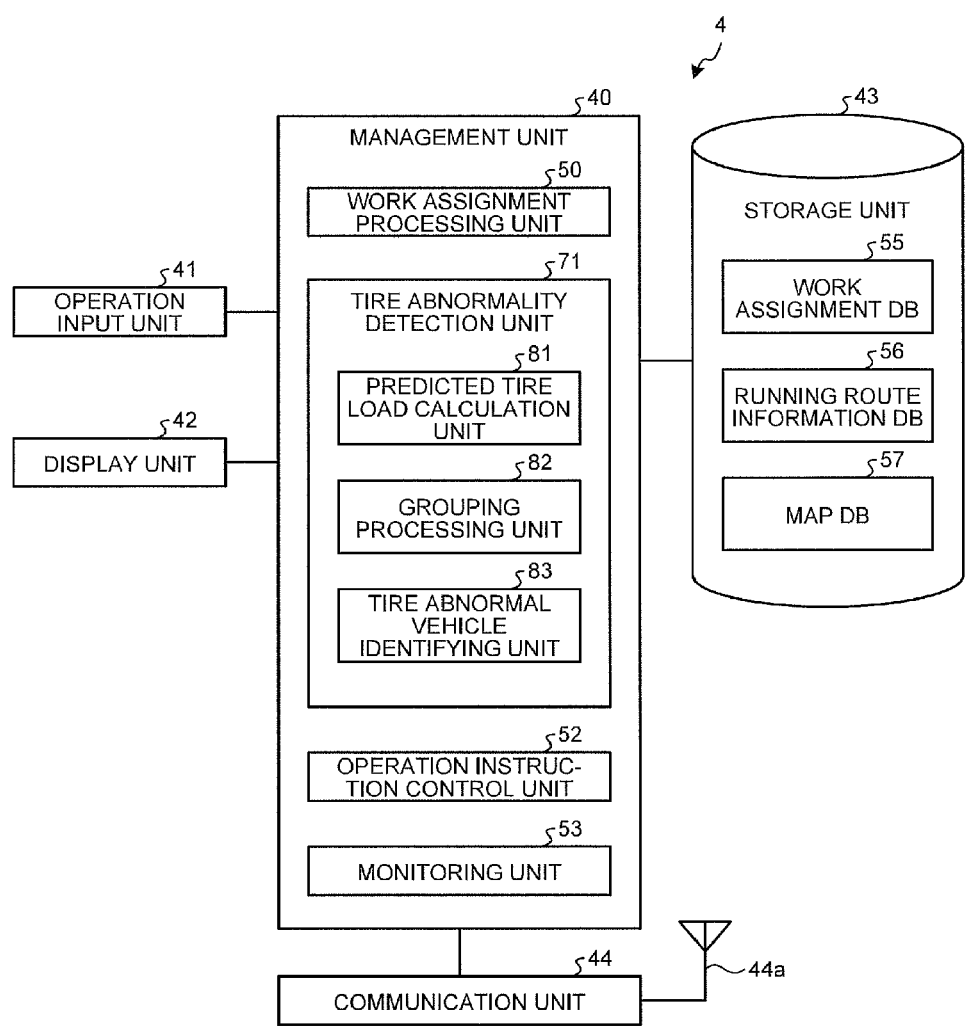
FIG. 7 is a block diagram illustrating a configuration of a management apparatus according to a second embodiment.

FIG. 7 is a block diagram illustrating a configuration of a management apparatus 4 of a tire abnormality management system according to a second embodiment of the present invention. According to the first embodiment described above, the dump trucks are grouped by detecting the actual tire load in real time, and among the grouped dump trucks, a dump truck with an abnormal tire is identified. In the second embodiment, however, a predicted tire load is calculated in the planning stage, the dump trucks are grouped using the predicted tire load, and among the grouped dump trucks, a dump truck with an abnormal tire is identified.

The management apparatus 4 illustrated in FIG. 7 is provided with a tire abnormality detection unit 71 instead of the tire abnormality detection unit 51 illustrated in FIG. 5. The other configuration is the same as that in the first embodiment. The tire abnormality detection unit 71 has a predicted tire load calculation unit 81, a grouping processing unit 82, and a tire abnormal vehicle identifying unit 83.

The predicted tire load calculation unit 81 calculates a predicted tire load of the work in the planning stage assigned to each dump truck 2. The grouping processing unit 82 groups dump trucks, in which the predicted tire load of work assigned to each dump truck 2 is within a predetermined range, into a dump truck group. Among the grouped dump trucks, when there is a dump truck 2 in which the statistic such as the deviation between the tire pressure or the tire temperature and the average value thereof exceeds the reference range, the tire abnormal vehicle identifying unit 83 identifies such dump truck 2 as a dump truck 2 with an abnormal tire.

[Tire Abnormality Detection Processing Using Predicted Tire Load]

The tire abnormality detection processing procedure by the tire abnormality detection unit 71 will be described with reference to the flowchart illustrated in FIG. 8. The processing is repeatedly performed at predetermined intervals.

Figure 8:
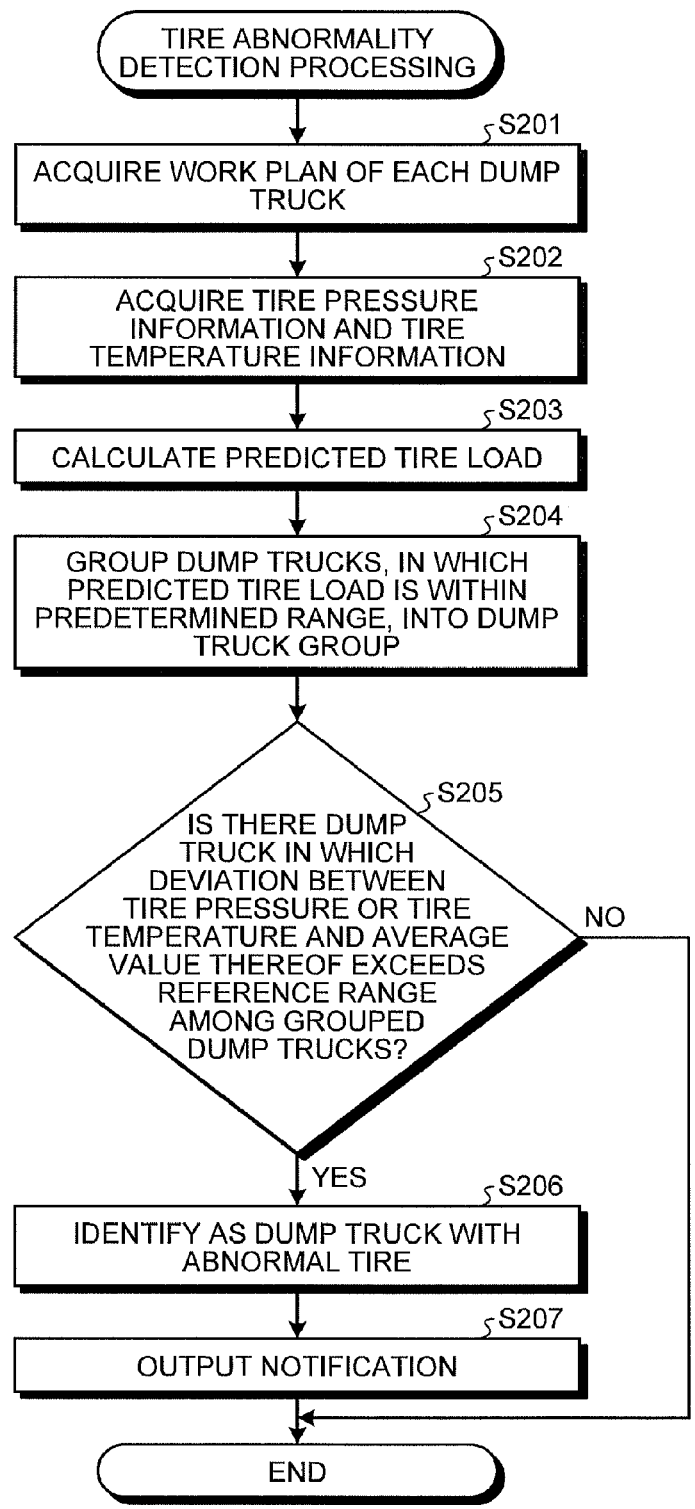
FIG. 8 is a flowchart illustrating a tire abnormality detection processing procedure by a tire abnormality detection unit illustrated in FIG. 7.

In FIG. 8, first, the predicted tire load calculation unit 81 acquires planned work at the planning stage of each dump truck 2 from the work assignment DB 55 (step S201). Then, the predicted tire load calculation unit 81 acquires tire pressure information and tire temperature information (step S202). Thereafter, the predicted tire load calculation unit 81 calculates a predicted tire load of the planned work (step S203).

The predicted tire load (predicted working condition TKPH) is determined by:

predicted tire load=(predicted applied tire load)× (predicted working speed).

The predicted applied tire load is determined by:

predicted applied tire load=((applied tire load when vehicle is empty)+(applied tire load when vehicle is loaded))/2.

As described above, the applied tire load, when the vehicle is empty, is the average applied tire load obtained by dividing the load of the empty dump truck 2 registered in advance by the number of tires of the dump truck. Moreover, the applied tire load, when the vehicle is loaded, is the average applied tire load obtained by dividing the load of the loaded dump truck 2 determined based on the loaded amount information sent from the dump truck 2 by the number of tires of the dump truck.

Meanwhile, a predicted working speed can be determined based on an interval vehicle speed which is registered in advance for each running path HL in the running route information DB 56. The predicted working speed may be determined based on a designated speed (speed command) to the dump truck 2 calculated based on running route three dimensional information of the running route information DB 56. The designated speed is determined by using tilt information, curvature information, swing acceleration limit, and the like of the running path HL. The predicted working speed may be obtained by predicting the interval speed information based on past dump truck running record information of the running route.

Then, the grouping processing unit 82 groups dump trucks, in which the predicted tire load calculated by the predicted tire load calculation unit 81 is within the predetermined range, into a dump truck group (step S204). Thereafter, the tire abnormal vehicle identifying unit 83 determines, among the grouped dump trucks, whether there is a dump truck in which the statistic such as the deviation between the tire pressure or the tire temperature and the average value thereof exceeds the reference range (step S205).

Among the grouped dump trucks, when there is no dump truck 2 in which the statistic such as the deviation between the tire pressure or the tire temperature and the average value thereof exceeds the reference range (step S205, No), the present processing ends. On the other hand, among the grouped dump trucks, when there is a dump truck 2 in which the statistic such as the deviation between the tire pressure or the tire temperature and the average value thereof exceeds the reference range (step S205, Yes), the dump truck 2 is identified as a dump truck 2 with an abnormal tire (step S206). Furthermore, the fact that the dump truck 2 is abnormal is displayed and output on the display unit 42, along with a notification to an external service center (not illustrated) (step S207), and the present processing ends.

According to the second embodiment, the dump trucks are grouped using the predicted tire load similar to an actual measurement of the actual tire load according to the first embodiment in order to identify a dump truck with an abnormal tire. Therefore, the abnormal state of the tire can be rapidly detected by simple processing.

It should be noted that in the first and second embodiments described above, in a case where a threshold value of the tire pressure and the tire temperature with respect to the tire load of the grouped dump trucks is known, the threshold value may be sent to the dump truck 2, and the dump truck 2 may return an abnormality determination result to the management apparatus 4. The threshold value is an absolute value, and is different from the statistics such as the relative deviation described above.

In the first and second embodiments described above, an unmanned dump truck has been described as an example of a transporting vehicle, but also a manned dump truck can be applied. In a case of a manned dump truck, the operation instruction such as work contents change is displayed on a display unit of the manned dump truck, so that the operator of the manned dump truck is notified of the operation instruction.

In addition, the wireless communication system between the management apparatus 4 serving as a master station and each dump truck 2 serving as a slave station is connected to the base station 5. Alternatively, the wireless communication system may be a wireless ad hoc network system not using any base station 5, that is, an autonomous decentralized wireless network system. In such case, it is preferable that a similar function to that of the management apparatus 4 serving as the master station be mounted in one dump truck 2. By performing vehicle-to-vehicle communication between the dump trucks 2, the wireless communication system with a simple configuration can be realized. The vehicle-to-vehicle communication may be realized through a system in which the dump trucks 2 communicate with each other, or may be realized by communicatively connecting the dump trucks 2 by creating a simple wireless area on the roadside.

REFERENCE SIGNS LIST

1 Management system
2 Dump truck
3 Loading machine
4 Management apparatus
5 Base station
6 Control facility
7 GPS satellite
21 Vehicle main body
22 Vessel
23 Processing unit
23*a* Identification ID
24 Gyro sensor
25 Speed sensor
26 Load sensor
27*a*, 28*a*, 44*a* Antenna
27, 44 Communication unit
28 GPS apparatus
29 Vehicle wheel
29*a* Tire
29*b* Wheel
30 Suspension cylinder
31 Running control unit
32 Actuator
33 Tire pressure sensor
34 Tire temperature sensor
35 Sensor information acquisition unit
40 Management unit
41 Operation input unit
42 Display unit
43 Storage unit
50 Work assignment processing unit
51, 71 Tire abnormality detection unit
52 Operation instruction control unit
53 Monitoring unit
61 Actual tire load calculation unit
62, 82 Grouping processing unit
63, 83 Tire abnormal vehicle identifying unit
81 Predicted tire load calculation unit
55 Work assignment DB
56 Running route information DB
57 Map DB
R1 to R4 Running route

The invention claimed is:

1. A tire abnormality management system that assigns work to each of a plurality of vehicles and manages an abnormal state of a tire mounted on each of the vehicles that perform the assigned work, the tire abnormality management system comprising:
a work assignment processing unit configured to create work assignments for the plurality of vehicles;
an operation instruction control unit outputs to each of the plurality of vehicles an instruction which causes the vehicle to execute a work assignment created by the work assignment processing unit;
a tire sensor configured to detect a tire pressure and/or a tire temperature of each of the vehicles;

a grouping processing unit configured to perform grouping vehicles to allocate the vehicles into one or more groups, so that a tire load of the work assigned to each of the vehicles is within a predetermined range in each of the groups; and a tire abnormal vehicle identifying unit configured to identify, in each of the groups, a vehicle with an abnormal tire based on the tire pressure or the tire temperature detected by the tire sensor, wherein the vehicles are allocated into the one or more groups before the tire abnormal vehicle identifying unit identifies the vehicle with the abnormal tire.

2. The tire abnormality management system according to claim 1, wherein the tire abnormal vehicle identifying unit, among the grouped vehicles, determines a statistic based on the tire pressure or the tire temperature detected by the tire sensor, and when there is a vehicle with the statistic exceeding a reference range, the tire abnormal vehicle identifying unit identifies such vehicle as a vehicle with an abnormal tire.

3. The tire abnormality management system according to claim 1, comprising an actual tire load calculation unit configured to calculate an actual tire load which is a tire load of the vehicle in actual operation based on loaded amount information and vehicle speed information notified from each of the vehicles connected wirelessly, wherein the grouping processing unit groups vehicles, in which an actual tire load of work assigned to each of the vehicles is within a predetermined range, into a vehicle group.

4. The tire abnormality management system according to claim 1, comprising a predicted tire load calculation configured to calculate a predicted tire load of work in a planning stage assigned to each of the vehicles, wherein the grouping processing unit groups vehicles, in which a predicted tire load of work assigned to each of the vehicles is within a predetermined range, into a vehicle group.

5. The tire abnormality management system according to claim 1, wherein information on the vehicle identified by the tire abnormal vehicle identifying unit is output externally.

6. The tire abnormality management system according to claim 1, wherein the tire load is a TKPH.

7. A tire abnormality management method for assigning work to each of a plurality of vehicles and managing an abnormal state of a tire mounted on each of the vehicles that perform the assigned work, the tire abnormality management method comprising:

a creation step of creating work assignments for the plurality of vehicles;

a control step of outputting to each of the plurality of vehicles an instruction which causes the vehicle to execute a work assignment created by the creation step;

a detection step of detecting a tire pressure and/or a tire temperature of each of the vehicles;

a grouping processing step of performing grouping vehicles, to allocate the vehicles into one or more groups, so that a tire load of the work assigned to each of the vehicles is within a predetermined range in each of the groups; and a tire abnormal vehicle identifying step of identifying, in each of the groups, a vehicle with an abnormal tire based on the tire pressure or the tire temperature detected by the tire sensor, wherein the vehicles are allocated into the one or more groups before the tire abnormal vehicle identifying step identifies the vehicle with the abnormal tire.

8. The tire abnormality management method according to claim 7, wherein the tire abnormal vehicle identifying step, among the grouped vehicles, determines a statistic based on the tire pressure or the tire temperature detected by the detection step, and when there is a vehicle with the statistic exceeding a reference range, the tire abnormal vehicle identifying step identifies such vehicle as a vehicle with an abnormal tire.

9. The tire abnormality management method according to claim 7, comprising an actual tire load calculation step of calculating an actual tire load which is a tire load of the vehicle in actual operation based on loaded amount information and vehicle speed information notified from each of the vehicles connected wirelessly, wherein the grouping processing step groups vehicles, in which an actual tire load of work assigned to each of the vehicles is within a predetermined range, into a vehicle group.

10. The tire abnormality management method according to claim 7, comprising a predicted tire load calculation step of calculating a predicted tire load of work in a planning stage assigned to each of the vehicles, wherein the grouping processing step groups vehicles, in which a predicted tire load of work assigned to each of the vehicles is within a predetermined range, into a vehicle group.

11. The tire abnormality management method according to claim 7, wherein information on the vehicle identified by the tire abnormal vehicle identifying step is output externally.

12. The tire abnormality management method according to claim 7, wherein the tire load is a TKPH.

13. A tire abnormality management system that assigns work to each of a plurality of vehicles and manages an abnormal state of a tire mounted on each of the vehicles that perform the assigned work, the tire abnormality management system comprising:

a tire sensor configured to detect a tire pressure and/or a tire temperature of each of the vehicles;

a memory; and a processor, which is in communication with the memory, configured:

to create work assignments for the plurality of vehicles, to output to each of the plurality of vehicles an instruction which causes the vehicle to execute a work assignment created by the processor, to perform grouping vehicles to allocate the vehicles into one or more groups, so that a tire load of the work assigned to each of the vehicles is within a predetermined range in each of the groups, and to identify, in each of the groups, a vehicle with an abnormal tire based on the tire pressure or the tire temperature detected by the tire sensor, wherein the vehicles are allocated into the one or more groups before the processor identifies the vehicle with the abnormal tire.

14. The tire abnormality management system according to claim 13, wherein the processor, among the grouped vehicles, determines a statistic based on the tire pressure or the tire temperature detected by the tire sensor, and when there is a vehicle with the statistic exceeding a reference range, the processor identifies such vehicle as a vehicle with an abnormal tire.

15. The tire abnormality management system according to claim 13, wherein the processor is further configured to calculate an actual tire load which is a tire load of the vehicle in actual operation based on loaded amount information and vehicle speed information notified from each of the vehicles connected wirelessly, wherein the processor groups vehicles, in which an actual tire load of work assigned to each of the vehicles is within a predetermined range, into a vehicle group.

16. The tire abnormality management system according to claim 13, wherein the processor is further configured to calculate a predicted tire load of work in a planning stage assigned to each of the vehicles, wherein the processor groups vehicles, in which a predicted tire load of work assigned to each of the vehicles is within a predetermined range, into a vehicle group.

17. The tire abnormality management system according to claim 13, wherein information on the vehicle identified by the processor is output externally.

18. The tire abnormality management system according to claim 13, wherein the tire load is a TKPH.

* * * * *